S. T. BOYD.
AUTOMOBILE SPRING HUB.
APPLICATION FILED OCT. 22, 1908.
948,388.
Patented Feb. 8, 1910.
Fig. 1.
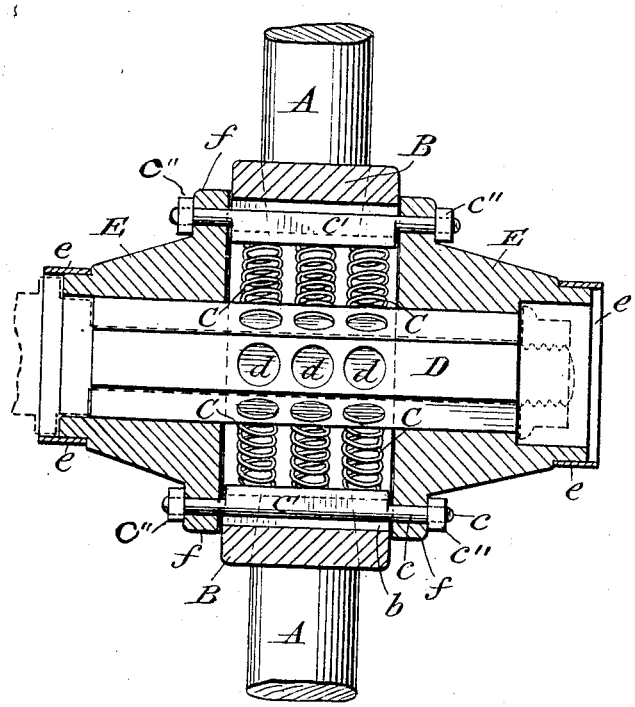
Fig. 2.
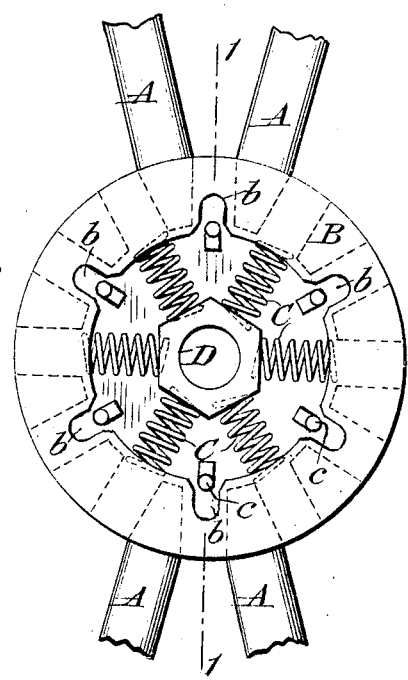
Fig. 3.
Fig. 5.
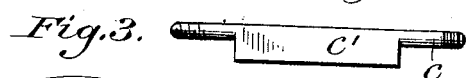
Fig. 4.
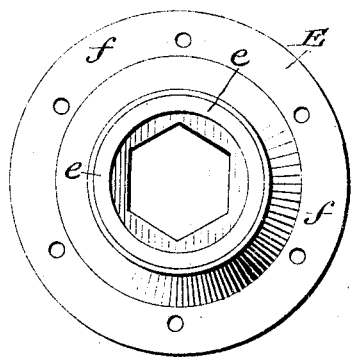
Witnesses:
Fig. 6.
Fig. 7.
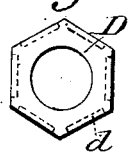
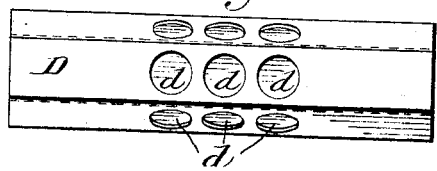
Inventor:
Slemmons T. Boyd

UNITED STATES PATENT OFFICE.

SLEMMONS T. BOYD, OF SLOAN, IOWA.

AUTOMOBILE SPRING-HUB.

948,388.     Specification of Letters Patent.     Patented Feb. 8, 1910.

Application filed October 22, 1908. Serial No. 459,111.

*To all whom it may concern:*

Be it known that I, SLEMMONS T. BOYD, a citizen of the United States, residing at Sloan, Woodbury county, Iowa, have invented a new Improvement in Automobile Spring-Hubs, of which the following is a specification.

My invention relates to the hubs of wheels of vehicles and particularly to the hubs of automobiles.

The object of the invention is the construction of a wheel which renders unnecessary the use of expensive and destructible tires and at the same time provides the required elasticity. I accomplish this object by the means illustrated in the accompanying drawing in which—

Figure 1 is a cross-section of hub on line I—I, Fig. 2, the end pieces being shown in Fig. 1. Fig. 2 is a view of hub in side elevation, the end pieces being omitted. Fig. 3 is an inner end view of end piece and Fig. 4 is an external view of the same. Fig. 5 is an enlarged detail view of bolt securing the end pieces to the hub. Fig. 6 is an end view of thimble adapted to inclose the axle, and Fig. 7 is a side elevation of the same.

Referring to the illustration, A, A, are the spokes of the wheel secured in the rim of the hub, B. The latter is somewhat wider than the spokes and has a round central opening in which are inclosed the springs C, C, and the thimble D. At regular intervals the rim is provided with a rounded slot, *b*, opening at one end into the central space. In the slots are inserted the bolts *c, c*, which are provided on one side with a shoulder *c'* of the same length as the thickness of the rim, the bolts extending beyond the rim on each side thereof, and passing through the outer shoulders or set-offs *f*, of the end pieces E, securing the hub together. The bolts are provided at each end with nuts *c*. The thimble D is round internally adapted to fit the axle and is six sided externally. On each side are three indentations or circular recesses *d*, in each of which rests a coil spring C, the outer ends of the springs resting in similar recesses against the inner surface of the rim. The set-offs *f* of the end pieces fit against the sides of the rims. The end pieces are six sided internally, corresponding to the thimble, and fit over the ends of the thimble. The inner faces are smooth and they slope externally from the set-offs to the outer ends where the usual rims *e, e*, are secured. The end pieces are rounded and recessed internally at the outer ends to permit the entrance of the shoulder of the axle and the nut on the axle's outer end, shown in the dotted lines.

The springs are secured in the central space between the end pieces, radiating from the thimble to the rim. The slot in the rim B being longer than the diameter of the bolts, permits a limited movement of the rim with reference to the end pieces, the pressure of the load on the axle being met by the springs opposite.

The springs furnish a complete cushion for the load and are securely boxed within the center of the hub free from dust and dirt. The hub may be taken apart by merely removing the bolts when the springs or other parts may be replaced or repaired.

Having described my invention, what I claim as new and desire to secure by Letters Patent, is—

A hub having in combination a rim B in which the spokes are secured, the rim having slots at regular intervals opening into the central space, a thimble D through which the axle passes inclosed within the central space in the rim and having a plurality of sides with recesses therein, springs C held in the recesses and extending radially between the thimble and the rim, end pieces E on each side of the springs inclosing the ends of the thimble having central openings corresponding to the sides of the thimble and shoulders *f* fitting against the sides of the rim, and bolts *c*, inserted in the slots in the rim and extending beyond the rim on each side thereof through the shoulders of the end pieces, securing the hub together, the diameter of the bolts being less than the corresponding length of the slots and permitting a limited movement of the rim with reference to the end pieces, substantially as described.

Dated September 29, 1908.

SLEMMONS T. BOYD.

Witnesses:
    A. L. CALDERHEAD,
    R. Z. MITCHELL.